(12) United States Patent
Lip Vui et al.

(10) Patent No.: US 11,222,120 B2
(45) Date of Patent: Jan. 11, 2022

(54) STORAGE DEVICE FIRMWARE BOOTLOADER RECOVERY SYSTEM AND METHOD THEREFOR

(71) Applicant: DELL PRODUCTS, LP, Round Rock, TX (US)

(72) Inventors: Simon Kan Lip Vui, Hillbrooks (SG); Nicholas D. Grobelny, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 70 days.

(21) Appl. No.: 16/688,347

(22) Filed: Nov. 19, 2019

(65) Prior Publication Data
US 2021/0150032 A1    May 20, 2021

(51) Int. Cl.
| | |
|---|---|
| *G06F 21/57* | (2013.01) |
| *G06F 9/4401* | (2018.01) |
| *H04L 9/08* | (2006.01) |
| *G06F 13/20* | (2006.01) |
| *G06F 13/42* | (2006.01) |

(52) U.S. Cl.
CPC .......... *G06F 21/575* (2013.01); *G06F 9/4403* (2013.01); *G06F 13/20* (2013.01); *G06F 13/4282* (2013.01); *H04L 9/08* (2013.01)

(58) Field of Classification Search
CPC ...... G06F 21/575; G06F 9/4403; G06F 13/20; G06F 13/4282; H04L 9/08
USPC .......................................................... 713/2
See application file for complete search history.

(56) References Cited

U.S. PATENT DOCUMENTS

| | | | | |
|---|---|---|---|---|
| 4,402,067 A | * | 8/1983 | Moss | G11C 17/12 |
| | | | | 365/189.02 |
| 4,562,435 A | * | 12/1985 | McDonough | G09G 5/39 |
| | | | | 345/545 |
| 4,937,781 A | * | 6/1990 | Lee | G06F 13/18 |
| | | | | 365/230.05 |
| 5,099,331 A | * | 3/1992 | Truong | G09G 5/397 |
| | | | | 345/536 |
| 5,559,952 A | * | 9/1996 | Fujimoto | G06F 12/0875 |
| | | | | 345/531 |
| 7,765,393 B1 | * | 7/2010 | Lee | G06F 11/1417 |
| | | | | 713/2 |
| 8,065,563 B2 | * | 11/2011 | Lai | G06F 11/1417 |
| | | | | 714/36 |

(Continued)

OTHER PUBLICATIONS

NVM Express Revision 1.0b Jul. 12, 2011 (Year: 2011).*

*Primary Examiner* — Paul R. Myers
(74) *Attorney, Agent, or Firm* — Larson Newman, LLP

(57) ABSTRACT

A method includes receiving an indicator at a basic input/output system of an information handling system, the indicator identifying that validation of a boot loader at a non-volatile memory at a data storage device failed authentication. The boot loader is configured to identify application layer firmware at the data storage device. The method further includes retrieving a replacement boot loader from a predetermined storage location and providing the replacement boot loader to a baseboard management controller (BMC). The method further includes transmitting the replacement boot loader to the data storage device via a serial interface other than a primary interface configured to support access of user data at the data storage device.

19 Claims, 3 Drawing Sheets

(56) References Cited

U.S. PATENT DOCUMENTS

| | | | |
|---|---|---|---|
| 8,751,783 B2* | 6/2014 | Piwonka | G06F 9/441 |
| | | | 713/2 |
| 9,542,195 B1* | 1/2017 | Astarabadi | G06F 11/1469 |
| 9,563,497 B2 | 2/2017 | Dasari et al. | |
| 9,817,975 B2* | 11/2017 | Liu | G06F 21/554 |
| 9,946,553 B2 | 4/2018 | Parthiban et al. | |
| 10,891,139 B1* | 1/2021 | Rhea | G06F 21/575 |
| 2006/0236150 A1* | 10/2006 | Lintz, Jr. | G06F 11/1417 |
| | | | 714/6.13 |
| 2007/0050611 A1* | 3/2007 | Weikel | G06F 9/4406 |
| | | | 713/2 |
| 2009/0193211 A1* | 7/2009 | Hu | G06F 21/575 |
| | | | 711/163 |
| 2012/0079287 A1* | 3/2012 | Leclercq | G06F 21/575 |
| | | | 713/192 |
| 2013/0173952 A1* | 7/2013 | Gao | G06F 9/4406 |
| | | | 714/3 |
| 2013/0279689 A1* | 10/2013 | Obaidi | H04L 9/3226 |
| | | | 380/28 |
| 2014/0173179 A1* | 6/2014 | Ali | G06F 3/0688 |
| | | | 711/103 |
| 2014/0365755 A1* | 12/2014 | Liu | G06F 21/572 |
| | | | 713/2 |
| 2015/0309803 A1* | 10/2015 | Sahu | G06F 11/1417 |
| | | | 714/21 |
| 2017/0039053 A1* | 2/2017 | Siluvainathan | G06F 9/4401 |
| 2017/0322816 A1* | 11/2017 | Parthiban | G06F 9/4416 |
| 2018/0101388 A1* | 4/2018 | Hummel | G06F 8/65 |
| 2018/0260569 A1* | 9/2018 | Sutton | G06F 21/575 |
| 2018/0276385 A1* | 9/2018 | Heck | G06F 3/0656 |
| 2018/0365422 A1* | 12/2018 | Callaghan | H04L 63/0442 |
| 2019/0042754 A1* | 2/2019 | Jreij | G06F 21/575 |
| 2020/0097659 A1* | 3/2020 | Olarig | H04L 67/34 |

* cited by examiner

STORAGE DEVICE FIRMWARE BOOTLOADER RECOVERY SYSTEM AND METHOD THEREFOR

FIELD OF THE DISCLOSURE

This disclosure generally relates to information handling systems, and more particularly relates to storage device firmware bootloader recovery.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A method may include receiving an indicator at a basic input/output system of an information handling system, the indicator identifying that validation of a boot loader at a data storage device failed authentication. The boot loader is configured to identify application layer firmware at the data storage device. The method may further include retrieving a replacement boot loader from a predetermined storage location and providing the replacement boot loader to a baseboard management controller. The method may further include transmitting the replacement boot loader to the data storage device via a serial interface other than a primary interface configured to support access of user data at the data storage device.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
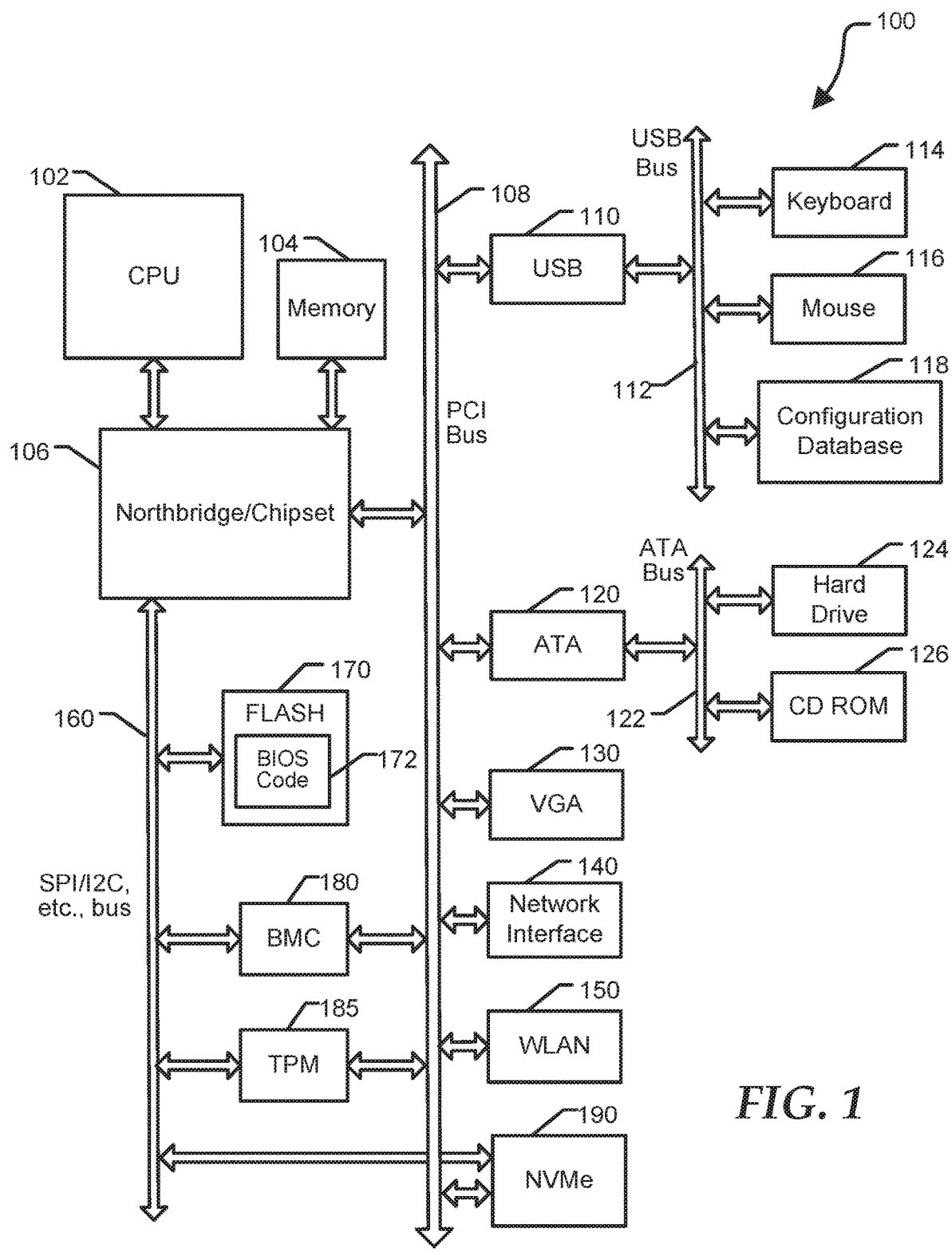
FIG. 1 is a block diagram of an information handling system according to a specific embodiment of the present disclosure.

FIG. 1 illustrates an information handling system 100 including a processor 102, a memory 104, a northbridge/chipset 106, a PCI bus 108, a universal serial bus (USB) controller 110, a USB 112, a keyboard device 114, a mouse device controller 116, an eye-tracking device 118, an ATA bus controller 120, an ATA bus 122, a data storage device 124, a compact disk read only memory (CD ROM) device 126, a video graphics array (VGA) device 130, a display device 131, a network interface controller (NIC) 140, a wireless local area network (WLAN) controller 150, one or more serial busses 160, a NVRAM 170 for storing BIOS 172, a baseboard management controller (BMC) 180, a trusted platform module (TPM) 185, and an NVMe data storage device 190.

BMC 180 can be referred to as a service processor, an embedded controller (EC), and the like. BMC 180 includes a processor that can operate out-of-band with respect to CPU 102. For example, remote management systems can utilize BMC 180 to access components at information handling system independent of an operating state of CPU 102. BMC 180 may be responsible for performing low level hardware tasks including thermal management and power management operations. TPM 185 is compliant with an international standard for a secure cryptoprocessor, a dedicated microcontroller designed to secure hardware through integrated cryptographic keys. NVRAM 170 can be referred to as a SPI flash storage device, BIOS SPI, and the like.

NVMe 190 is a non-volatile data storage media attached to a PCI Express (PCIe) bus, such as PCI bus 108. NVMe 190 further includes a serial communication interface, for example compliant with an I2C bus protocol, a SPI bus protocol, and the like. NVMe 190 is typically implemented as a computer expansion memory card, for example an M.2 card, and the like, that is provided at the mainboard of system 100. NVMe 190 can be compliant with a non-volatile host controller interface, for example the Non-Volatile Host Controller Interface Specification (NVMHCIS). NVMe 190 can provide increased access performance compared to a solid state drive (SSD) that interfaces to CPU 102 via ATA bus 122 or the like.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and one ore more components can be integrated together. For example, portions of chipset 106 can be integrated within CPU 102. In an embodiment, chipset 106 can include a platform controller hub (PCH). System 100 can include additional buses and bus protocols. Serial bus 160 is representative of one or more busses and/or bus protocols, such as a serial peripheral interface (SPI) bus, an I2C bus, a system management bus (SMB), a power management bus (PMBus), and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

BIOS 172 includes instructions executable by CPU 102 to initialize and test the hardware components of system 100, and to load a boot loader or an operating system (OS) from a mass storage device. BIOS 172 additionally provides an abstraction layer for the hardware, i.e. a consistent way for application programs and OS to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device. In an embodiment, BIOS 172 can provide one or more runtime processes or device drivers that are configured to support functionality disclosed herein. After the initialization procedure is complete and an operating system, such as Windows, is loaded, computational operation of information handling system can begin.

In an embodiment, the BIOS 172 can be substantially compliant with one or more revisions of the UEFI specification. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the OS. The UEFI specification allows for the extension of platform firmware by loading UEFI driver and UEFI application images. For example, an original equipment manufacturer can include customized or proprietary images to provide enhanced control and management of the information handling system 100. While the techniques disclosed herein are described in the context of a UEFI compliant system, one of skill will appreciate that aspects of the disclosed systems and methods can be implemented at substantially any information handling system having configurable firmware.

Figure 2:
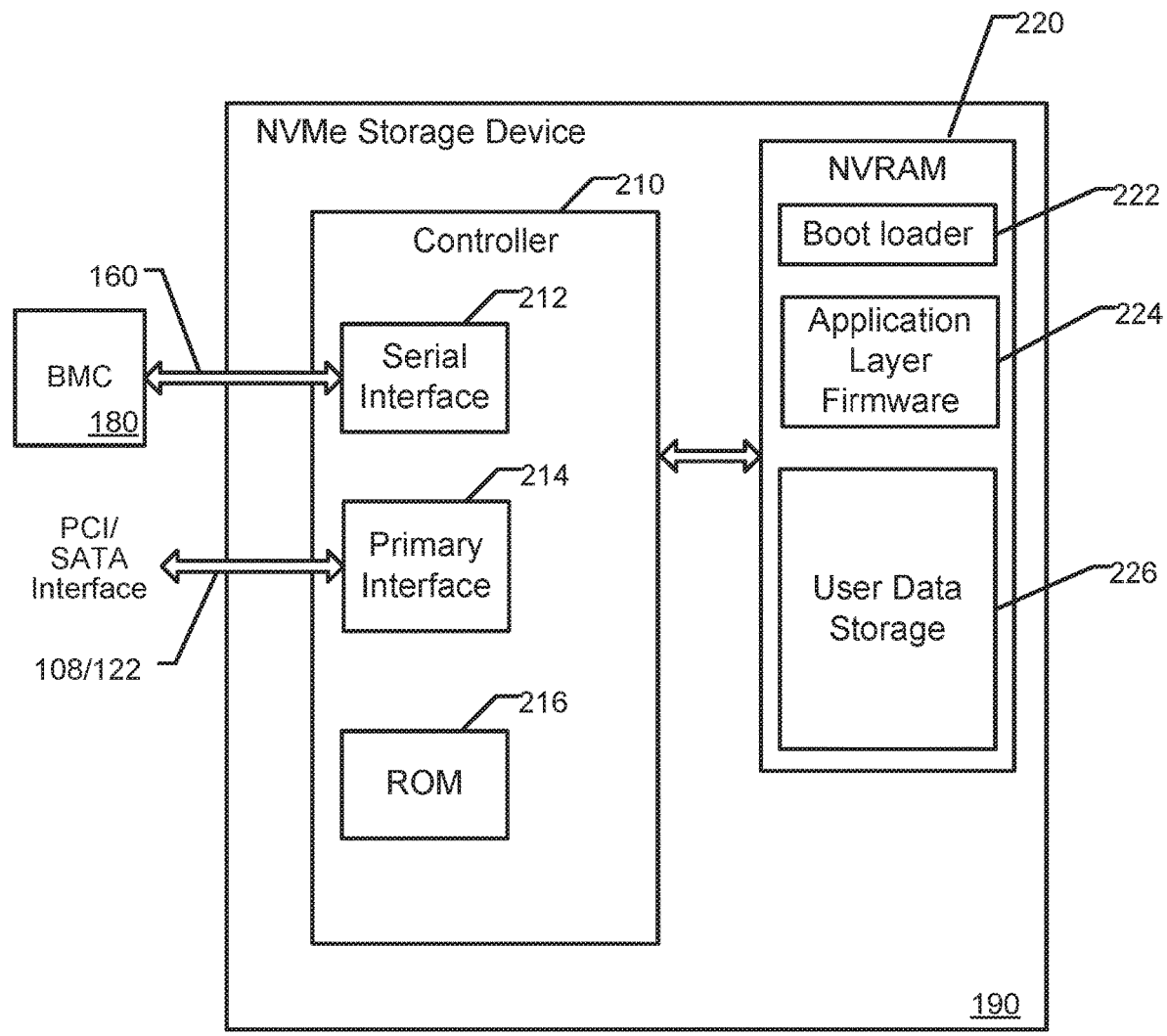
FIG. 2 is a block diagram illustrating a data storage device at the information handling system according to a specific embodiment of the present disclosure.

FIG. 2 shows further details of NVMe 190 of information handling system 100 according to a specific embodiment of the present disclosure. NVMe 190 includes a controller 210 and a non-volatile memory 220. Controller 210 includes a serial interface 212, a primary interface 214 and a read-only memory 216. Serial interface 212 can include a universal asynchronous receiver-transmitter (UART), an I2C bus compliant interface, a SPI bus compliant interface, or the like. Primary interface 214 can include a PCIe or SATA compliant interface, or the like. Non-volatile memory 220 includes storage locations for storing a boot loader 222, application layer firmware 224, and user data 226. Serial interface 212 can be communicatively coupled to BMC 180 via a serial bus, such as serial bus 160. Primary interface 214 provides high speed access to user data 226 by CPU 102 during normal operation of information handling system 100. ROM 216 is configured to store program instructions responsible for initializing controller 210, including in an embodiment, authentication of boot loader 222 at non-volatile memory 220. Boot loader 222 includes instructions executable by controller 212 to identify application layer firmware 224. Boot loader 220 may be referred to as an initial boot block, bootstrap code, and the like. In an embodiment, boot loader 220 can be configured to authenticate application layer firmware 224. Application layer firmware 224, when executed by controller 212, can be configured to initialize the primary interface 214 to support access of user data 226 by CPU 102.

Non-volatile memory 220 can include redundant copies of application layer firmware 224, and may include a previous version of firmware 224 or a revised version of firmware 224. In an embodiment, information handling system 100 can initiate an update of application layer firmware 224 at non-volatile memory 220, wherein firmware 224 is replaced with revised firmware. If the update procedure fails, such as if the firmware is corrupted due to a malicious attack or due to a loss of power to system 100 while storing the revised firmware at non-volatile memory 220, a redundant copy of the previous application layer firmware can be used to replace the corrupted application layer firmware. In an embodiment, boot loader 222 can utilize a redundant copy of application layer firmware 224 in response to determining that the current copy of firmware 224 fails authentication.

Because boot loader 222 is stored at a mutable memory device, it too may be subject to malicious attack. As disclosed herein, controller 210 can initiate a boot loader recovery procedure in response to determining that authentication of boot loader 222 has failed. In an embodiment, controller 210 can alert system 100 of the authentication failure. For example, controller 210 can assert an interrupt at serial interface 212, such as a system management bus alert (SMBAlert). In response to receiving the alert at system 100, BIOS 172 can retrieve a replacement copy of boot loader 222 from a predetermined storage location. For example, the replacement boot loader can be retrieved from NVRAM 170, a storage device located remote from information handling system 100, or from another location. In an embodiment, the replacement boot loader can be stored at BMC 180. BMC 180 can transmit the replacement boot loader to controller 210 via serial interface 212. After receiving the replacement boot loader, controller 210 can authenticate the replacement boot loader and can store the replacement boot loader at non-volatile memory 220.

Figure 3:
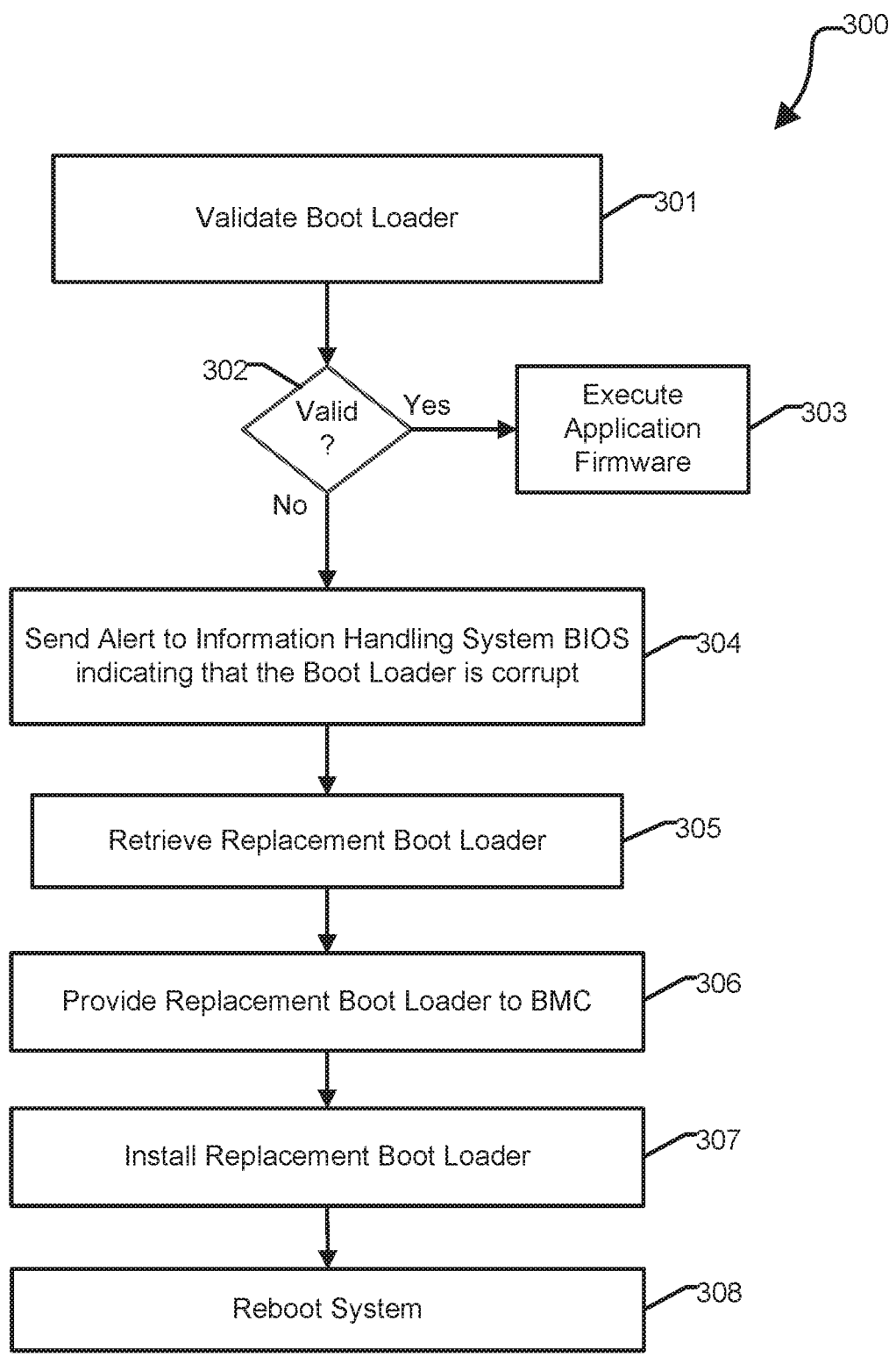
FIG. 3 is a flow diagram illustrating a method for replacing a corrupted boot loader at a data storage device according to a specific embodiment of the present disclosure.

FIG. 3 shows a method 300 for replacing a corrupted boot loader at a data storage device according to a specific embodiment of the present disclosure. Method 300 begins at block 301 where a boot loader at a data storage device is validated. For example, controller 210 can utilize one or more authentication techniques to evaluate the integrity of boot loader 222. If the boot loader is determined to be authentic, method 300 proceeds from decision block 302 to block 303 where application layer firmware identified by the boot loader at the storage device is executed, placing the storage device in a operational state. For example, boot loader 222 can identify a memory location corresponding to the location of application layer firmware 224. Controller 210 can execute application layer firmware 224. Application layer firmware 224 can initialize primary interface 214 at NVMe 190 and otherwise configured NVMe 190 to support access requests of user data storage 226 by CPU 102. If however the boot loader is determined to be invalid, method 300 proceeds from decision block 302 to block 304 where the data storage device issues an alert indicating that the boot loader is corrupt. For example, controller 210 can assert an interrupt or otherwise notify a BIOS process at information handling system 100 that boot loader 222 is compromised. In another embodiment, BIOS 172 or BMC 180 can issue a query to NVMe 190, requesting the status of the bootloader.

Method 300 continues at block 305 where the BIOS process retrieves a replacement boot loader from a predetermined storage location. For example, BIOS 172 can retrieve the replacement boot loader from NVRAM 170, BMC 190, a storage location external to information handling system, or from another, preferably secure, storage location. At block 306, the BIOS provides the retrieved replacement boot loader to the BMC, which transmits the replacement boot loader to the data storage device via a serial interface. For example, BMC 190 can send the replacement boot loader to controller 210 via serial interface 212. At block 307, controller 210 can install the replacement boot loader at non-volatile memory 220, thereby replacing the corrupted boot loader 222. In an embodiment, controller 210 can authenticate the replacement boot loader prior to storing the replacement boot loader at non-volatile memory 220. Method 300 completes at block 308 where the information handling system is rebooted. During the boot initialization of system, NVMe 190 can once again validate boot loader 222.

While the boot loader recovery techniques disclosed herein are described in the context of NVMe 190, one of skill will appreciate that these techniques can be utilized to identify and replace a corrupted boot loader at another type of data storage device, or at another type of device that includes a boot loader. As described above, controller 210 can be configured to authenticate boot loader 222, however in another embodiment, BMC 190 can access boot loader 222 via serial interface 212, perform authentication of boot loader 222, and initiate boot loader recovery if boot loader 222 fails authentication.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, such as a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a baseboard management controller (BMC);
   a basic input-output system (BIOS) memory device to store firmware executable to initialize operation of the information handling system; and
   a non-volatile memory express (NVMe) data storage device including:
      a controller including a program memory;
      a non-volatile memory to store:
         user data;
         application layer firmware executable by the controller to manage operation of the NVMe data storage device; and
         a boot loader executable by the controller to identify the application layer firmware;
      a serial interface configured to communicatively couple the controller and the BMC via a serial communication bus; and
      a primary interface configured to support access to the user data,
      wherein the program memory includes instructions executable by the controller to:
         authenticate the boot loader; and
         initiate replacement of the boot loader in response to determining that the boot loader failed authentication.

2. The information handling system of claim 1, wherein initiating replacement comprises:
   generating an interrupt at the serial interface; and
   receiving a replacement boot loader from the BMC via the serial interface.

3. The information handling system of claim 1, wherein a replacement boot loader is stored at the BMC.

4. The information handling system of claim 1, wherein a replacement boot loader is stored at the BIOS memory device.

5. The information handling system of claim 1, wherein a replacement boot loader is stored at a storage location that is physically remote to the information handling system and communicatively coupled to the BMC via a communication network.

6. The information handling system of claim 1, wherein the instructions are further configured to authenticate a replacement boot loader.

7. The information handling system of claim 1, wherein the application layer firmware is responsible for initializing the primary interface at the data storage device.

8. A method comprising:
   receiving an indicator at a basic input/output system of an information handling system, the indicator identifying that validation of a boot loader at a non-volatile memory express (NVMe) data storage device failed authentication, the boot loader configured to identify application layer firmware at the NVMe data storage device, the application layer firmware responsible for managing operation of the NVMe data storage device;
   retrieving a replacement boot loader from a predetermined storage location;
   providing the replacement boot loader to a baseboard management controller (BMC); and
   transmitting the replacement boot loader, by the BMC, to the NVMe data storage device via a serial interface, the serial interface different than a primary interface configured to support access of user data at the NVMe data storage device.

9. The method of claim 8, further comprising storing the replacement boot loader at the NVMe data storage device.

10. The method of claim 8, wherein the application layer firmware is responsible for initializing the primary interface at the NVMe data storage device.

11. The method of claim 8, wherein the replacement boot loader is retrieved from the BMC.

12. The method of claim 8, wherein the replacement boot loader is retrieved from a non-volatile memory configured to store a primary basic input/output system at the information handling system.

13. The method of claim 8, wherein the replacement boot loader is retrieved from a storage location that is physically remote to the information handling system and communicatively coupled to the BMC via a communication network.

14. A non-volatile memory express (NVMe) data storage device comprising:
   a controller including a program memory;
   a non-volatile memory to store:
      user data;
      application layer firmware executable by the controller to manage operation of the NVMe data storage device; and a boot loader executable by the controller to identify the application layer firmware, wherein the program memory includes instructions executable by the controller to:

authenticate the boot loader; and initiate replacement of the boot loader in response to determining that the boot loader failed authentication.

15. The NVMe data storage device of claim 14, wherein the controller further includes:

a serial interface configured to communicatively couple the NVMe data storage device to a baseboard management controller (BMC) at an information handling system via a serial communication bus; and a primary interface configured to support access to the user data at the non-volatile memory.

16. The NVMe data storage device of claim 15, wherein initiating replacement comprises:

generating an interrupt at the serial interface; and receiving a replacement boot loader from the BMC via the serial interface.

17. The NVMe data storage device of claim 15, wherein a replacement boot loader is stored at the BMC.

18. The NVMe data storage device of claim 15, wherein a replacement boot loader is stored at a non-volatile memory configured to store a primary basic input/output system at the information handling system.

19. The NVMe data storage device of claim 15, wherein a replacement boot loader is stored at storage location that is physically remote to the information handling system and communicatively coupled to the BMC via a communication network.

* * * * *